No. 844,217. PATENTED FEB. 12, 1907.
J. J. TROEGER.
TRANSMISSION MECHANISM.
APPLICATION FILED JAN. 31, 1906.
2 SHEETS—SHEET 2.
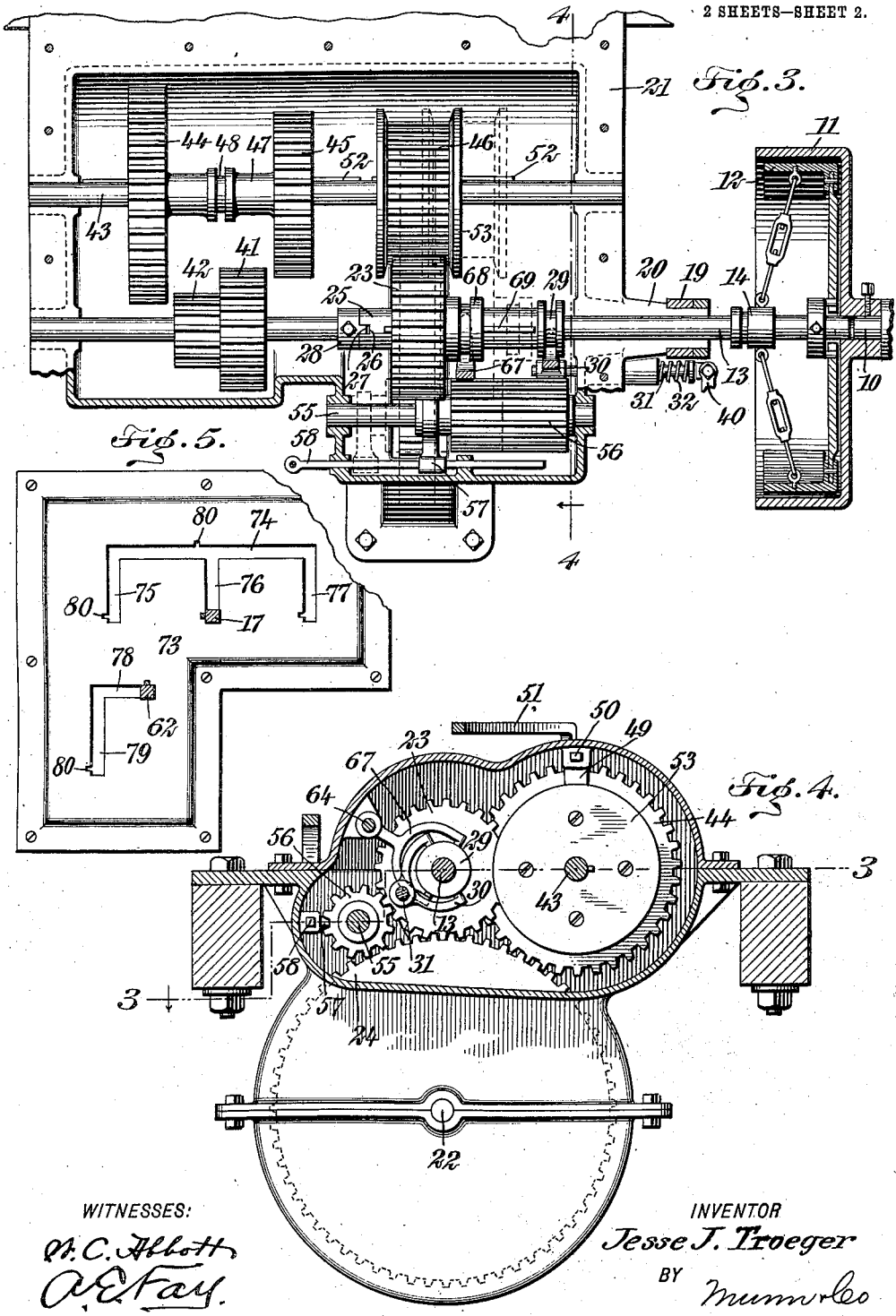
WITNESSES:
INVENTOR
Jesse J. Troeger
BY
ATTORNEYS

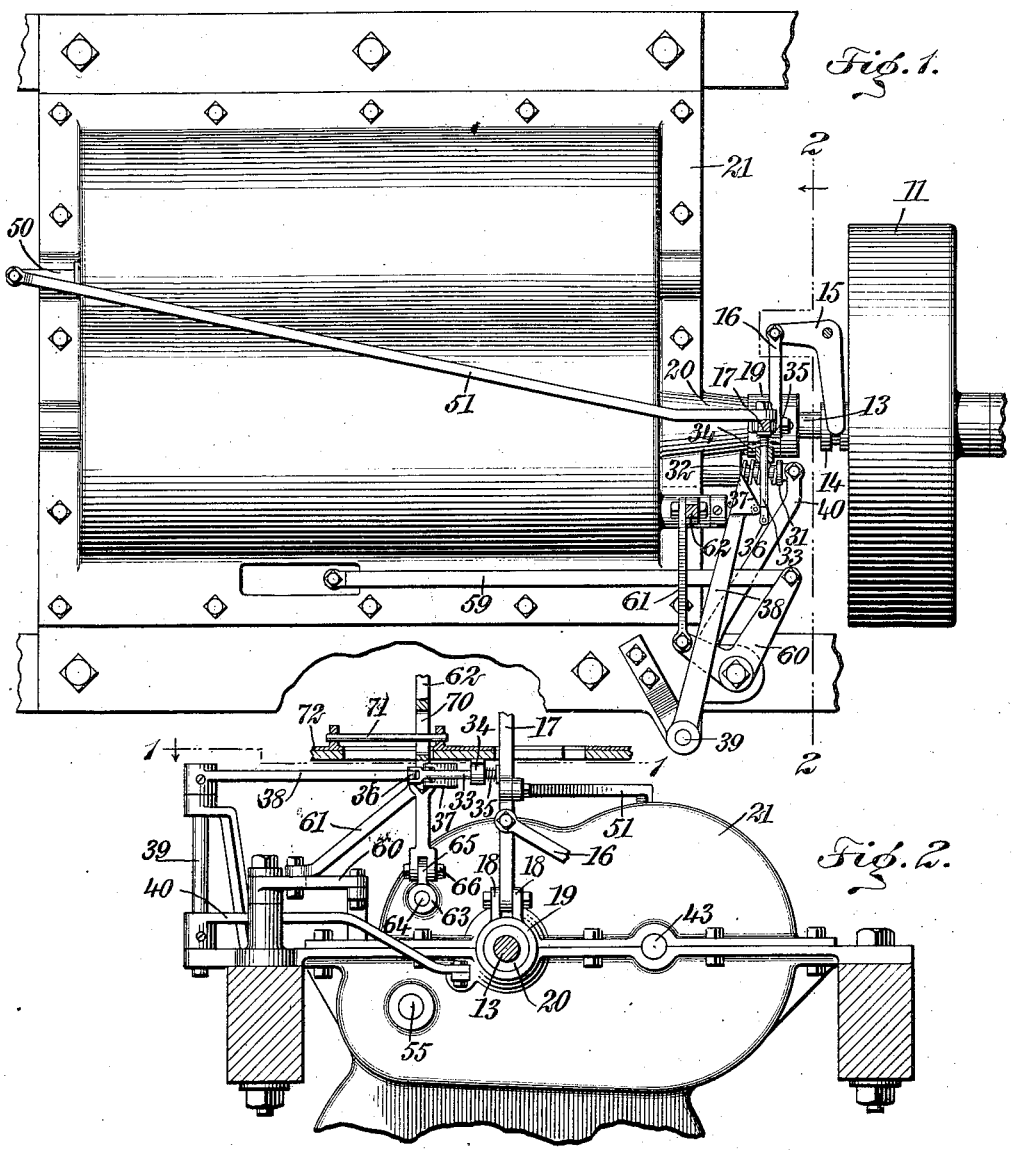

UNITED STATES PATENT OFFICE.

JESSE JEREMIAH TROEGER, OF CHICAGO, ILLINOIS.

TRANSMISSION MECHANISM.

No. 844,217. Specification of Letters Patent. Patented Feb. 12, 1907.

Application filed January 31, 1906. Serial No. 298,802.

*To all whom it may concern:*

Be it known that I, JESSE JEREMIAH TROEGER, a citizen of the United States, and a resident of Chicago, in the county of Cook and State of Illinois, have invented a new and Improved Transmission Mechanism, of which the following is a full, clear, and exact description.

My invention relates to a transmission mechanism comprising a reversing device and a device for varying speed.

The principal objects of the invention are to provide for obtaining the same number of different speeds in both the forward and reverse motion with the use of fewer gears than are ordinarily used in devices of this character; also, to provide a device which will give an additional speed in both directions by the simple addition of two gears; also, to so construct a device that all the gears can be placed in an oil-tight case, and thus readily lubricated.

Further features and advantages of the invention will appear below.

Reference is to be had to the accompanying drawings, forming a part of this specification, in which similar characters of reference indicate corresponding parts in all the figures.

Figure 1 is a horizontal sectional view on the line 1 1 of Fig. 2, showing most of the parts in plan and illustrating one embodiment of my invention. Fig. 2 is a sectional view of the same on the line 2 2 of Fig. 1. Fig. 3 is a sectional view on the line 3 3 of Fig. 4. Fig. 4 is a sectional view on the line 4 4 of Fig. 3, and Fig. 5 is a plan of a guide-plate for the operating-levers.

I have shown a shaft 10, from which power is transmitted through a pair of clutch members 11 and 12 to a shaft 13. The clutch members 12 are operated by a slide 14, which is operated by a yoke mounted on a bell-crank 15. It will be readily understood that the manipulation of this slide will connect and disconnect the shafts 10 and 13 in a manner which is common. The bell-crank is connected by a link 16 with an operating-lever 17. This operating-lever is pivoted on a pair of ears 18, which are mounted on a collar 19, rotatably mounted on a hub 20, through which the shaft 13 passes. Consequently the operating-lever is capable of motion in two directions about the two pivots formed in the ears 18 and on the shaft 13. When it moves on the pivot 18, the bell-crank will not be affected, but when it moves at right angles to the shaft upon the latter as a pivot the lever is operated in an obvious manner. The hub 20 is mounted upon an oil-tight casing 21, through which the shaft 13 passes, and which is designed to contain most of the operating parts of the transmission mechanism. It will be understood that this casing is intended to contain oil in which the various gears can run. The power-receiving shaft 13 is designed to transmit power to a shaft 22, which transmits the same to any desired machine or set of machinery. For transmiting the power directly a gear 23 is mounted on the shaft 13, and it meshes with a gear 24 on the shaft 22. In order to change the speeds from the ordinary speed which would be transmitted in this manner, the following mechanism is employed: The gear 23 is mounted on a sleeve 25, which is capable of rotating on the shaft 13. This sleeve is provided with a notch 26, in which is adapted to engage a tooth 27 on a collar 28, which is fixed to said shaft. The sleeve 25 is provided with a peripherally-grooved collar 29, with which a yoke 30 engages. This yoke is connected with a rod 31, which projects through the casing 21 and which is pressed outwardly by a spring 32, so as to normally hold the sleeve in such position that the tooth 27 will not engage in the notch 26, and power transmitted to the shaft 13 will therefore not be transmitted through the gear 23 directly. When, however, the lever 17 is in the position shown in Fig. 1, a pin 33, which slides in a bearing 34, rigidly connected with the frame, will be forced outwardly against the tension of a spring 35, and a roller 36 on this pin engages an inclined surface 37 on an arm 38, which is connected with a stud 39. With this stud is also connected another arm 40, which is in turn connected with the rod 31.

It will be seen that the bell-crank formed by the parts 38, 39, and 40 is operated by the pin 33 in such a manner that when the lever 17 is in the position indicated the rod 31 is forced inwardly, and the sleeve 25 assumes the position shown in Fig. 3. This is a position of the lever 17 in which the power is transmitted from the shaft 10 to the shaft 13 through the clutch, and it is obvious this power is then transmitted to the shaft 22 at a medium rate of speed produced by the relative sizes of the gears 23 and 24. For the purpose of varying this speed the shaft 13 is provided with another pair of gears 41 and 42 of different diameters, and a shaft 43 is provided parallel with the shaft 13 and having thereon two gears 44 and 45 for meshing with the gears 42 and 41, respectively, and a third gear 46 for meshing with the gear 23. Gears 44 and 45 are mounted on a sleeve 47, which has a collar 48, provided with a yoke 49 for sliding it, so that either of the gears may be forced into mesh with the corresponding gear on the shaft 13. The yoke 49 is connected with a slide 50. This slide passes through the casing 21 and is connected by a link 51 with the lever 17. The sleeve 47 is mounted on a key 52 on the shaft 43. The operation of these parts will be readily understood.

As has been indicated, the lever 17 can be moved on the pin running through the ears 18, as a pivot, and is shown in Fig. 1 in its medium position, in which the power is transmitted to shaft 22 at a medium rate of speed. When, however, this lever is pushed either to the right or left, the roller 36 will be disengaged from the surface 37 on account of the operation of the spring 35 to force the pin 33 backwardly, and the spring 32 will operate to withdraw the sleeve 25, and so prevent the transmission of motion from the shaft 13 to the shaft 22 through the gears 23 and 24. One of the gears 44 or 45, however, will be moved into mesh with its corresponding gear or pinion on the shaft 13 by the operation of the link 51 and slide 50. Consequently rotation will be imparted to the shaft 43 at either a higher or lower rate of speed than that of the shaft 13. The rotation of this shaft is transmitted to the gear 46 on account of a key 52, which is mounted thereon and which engages the gear. Motion is then transmitted from this gear through the gear 23, which rotates freely with respect to the shaft 13, to the gear 24. This modification of the speed may take place without any longitudinal motion of the gear 23; but if this gear is moved longitudinally a pair of flanges 53 on the gear 46 will be engaged by the gear 23, and the gear 46 will move with it along the keyway 52. This provides for giving three speeds to the driven shaft, and I will now describe the reversing mechanism, which operates to transmit motion to the driven shaft at three different rates of speed also. On a shaft 55 is mounted a double-faced gear or pinion 56, which is capable of meshing with both the gears 23 and 24. Connected with the gear 56 is a slide 57, which is in turn connected with a rod 58, this rod being operable by a link 59 and bell-crank 60.

This bell-crank 60 is connected by a link 61 with a reversing-lever 62. This lever is pivoted on a collar 63 on the frame 21, so as to swing about a rod 64 as a center. The collar is also provided with a projection 65, through which a pin 66 passes, on which the lever is also pivoted. The pin 66 and rod 64 are at right angles to each other. On the rod 64 is a yoke 67, which engages a collar 68 on the gear 23. The sleeve 25 is provided with a key 69, along which a gear and collar slide. The collar 63 is fixed to the rod 64, and the lever 62 is provided with a slot 70, by means of which it is pivoted on a rod 71. This rod is mounted in a stationary position on a frame 72, which may represent the cab of a motor-car or the floor of a vehicle of any kind. It will be seen, therefore, that the lever 62 is capable of pivotal motion on the rod 71 to move the shaft 64 and that it is capable of pivotal motion on the shaft 64, in which the lever slides along the rod 71, the latter passing through the perforation or slot 70.

In Fig. 5 I have shown a plate 73 over the floor 72. In this plate are passages for the levers 17 and 62. A passage 74 for the former is provided with three offsets 75, 76, and 77. A passage 78 for the lever 62 is provided with an offset 79. Each of these passages and offsets is provided with a notch 80 for receiving a latch on the lever. It is thought that the operation will be obvious. When the lever 17 is in the position shown in Fig. 1, in which speed is transmitted to the shaft 22 at a medium rate, it is in the offset 76, and when pushed from the slot 74 into the offset 76 the bell-crank 15 is manipulated, to couple the shafts 10 and 13. When it is desired to change the speed, the lever is moved from its position in the offset 76 to the main slot 74, which uncouples the shafts 10 and 13 and which also moves the lever away from the pin 33, so that the spring on the latter can withdraw it from engagement with the arm 38, so that the spring 32 can draw out the rod 31 and disconnect the shaft 13 from the sleeve 25, as has been explained. The lever is then pushed either to the right or left along the slot 74, which through the operation of the link 51 brings either of the gears 44 or 45 into engagement with its companion gear on the shaft 13. Then the lever is moved into the slot 75 or 77, as the case may be, which couples up the shafts 10 and 13 again and provides for transmitting motion to the shaft 22, either at a decreased or increased rate. Reversal can be had at any of the three speeds by manipulating the lever 62 in the slots 78 and 79 in a similar manner. The movement of the lever 62 on the rod 71 as a pivot moves the rod 64 and the gear 23, so as to bring the latter into mesh with the gear 56, as is indicated in dotted lines in Fig.

3. The pivotal movement of the lever 62 on the rod 64 forces the gear 56 in the other direction until it meshes with the gear 24. In this position the gears 23 and 24 are out of mesh with each other. As the sliding of the gear 23 is relative to the sleeve 25, it will be obvious that the manipulation of the speed-changing lever 17 will be performed in the same manner as before and that three speeds in the reverse direction can thus be obtained. By this construction six speeds in all are obtained with a minimum number of gears, while the operating means is very simple, being controlled entirely by one reversing-lever and one speed-changing lever. Furthermore, the gear 56, which is used in reversing, is out of engagement with the other gears when it is not in operation, and therefore is not subject to wear and it does not consume power except during reversal. By the provision of the oil-tight casing and the proper location of means for preventing the oil from passing through the bearings upon which the shafts and sliding rods are located a most efficient system of lubrication is provided. It will be further seen that in order to provide one or more additional speeds it will only be necessary to add two gears to the device, one on the shaft 13 and the other on the sleeve 47, for each additional speed desired, and, furthermore, that such speed will be available for use in both forward and reverse directions.

Having thus described my invention, I claim—

1. A transmission mechanism comprising a clutch, a shaft connected with said clutch, a sleeve mounted to slide and to turn on said shaft, a gear on said sleeve, means for locking the sleeve to the shaft, a second shaft, a power-receiving shaft, means including a lever for rendering the clutch inoperative, means controlled by said lever for unlocking the sleeve from said shaft, and means controlled by the lever for transmitting power from the first shaft, through the second shaft and the gear on the sleeve of the first shaft to the power-receiving shaft at a plurality of different rates of speed.

2. A power-transmission mechanism comprising two shafts, a clutch for connecting said shafts, a sleeve mounted to slide and to turn on one of said shafts, means for locking the sleeve to said shaft, a power-receiving shaft, a gear on the power-receiving shaft meshing with the gear on said sleeve, whereby when the sleeve is locked to the shaft the power is transmitted from the first two shafts to the power-receiving shaft at one rate of speed, a pair of gears of different diameters on the shaft on which the said sleeve is mounted, a shaft parallel with the first two shafts, a gear on said shaft in mesh with the gear on the sleeve, a pair of gears of different diameters mounted to slide on said parallel shaft and each adapted to be moved into mesh with one of the gears of the first-mentioned pair, and means for rendering the clutch inoperative, for unlocking the sleeve from the shaft, and for moving the said pair of gears on the parallel shaft, for transmitting motion to the power-receiving shaft at either of two different rates of speed.

3. A power-transmitting mechanism, comprising a shaft, a collar having a tooth and secured to said shaft, a sleeve slidably mounted on the shaft and provided with a notch for engagement by said tooth for transmitting rotation from the shaft to the sleeve, a gear on said sleeve, a power-receiving shaft, a gear on said shaft meshing with the first-named gear, an additional shaft, a gear on said additional shaft, meshing with the first-named gear, another gear secured to said first shaft, and a gear on the last-named shaft adapted to be brought into mesh with the second gear on the first shaft, and means for disengaging said sleeve from the collar.

4. A power-transmitting mechanism comprising a shaft, a sleeve slidably mounted thereon, means for preventing the sleeve from rotating independently of the shaft, means for rendering said first-named means inoperative, a gear on said sleeve, a second gear on said shaft, a second shaft, two gears on the second shaft, each being adapted to mesh with one of the gears on the first shaft, a third shaft, and a gear on the third shaft meshing with the gear on the sleeve.

5. A power-transmitting mechanism comprising a shaft, a sleeve thereon, means for locking the sleeve to the shaft, a gear on the sleeve and rotatable therewith, a plurality of additional gears on the shaft, a second shaft, a gear on the second shaft meshing with said gear on the sleeve, a plurality of gears slidably mounted on the second shaft and rotatable therewith for engaging the plurality of gears on the first shaft, and means for sliding one of the gears on the second shaft into mesh with one of the gears on the first shaft and unlocking the sleeve from the first shaft.

6. A power-transmitting mechanism comprising a shaft, a sleeve thereon, means for locking the sleeve to the shaft, a gear on the sleeve and rotatable therewith, a plurality of additional gears on the shaft, a second shaft, a gear on the second shaft meshing with said gear on the sleeve, a plurality of gears slidably mounted on a second shaft and rotatable therewith for engaging the plurality of gears on the first shaft, and means for sliding one of the gears on the second shaft into mesh with one of the gears on the first shaft and unlocking the sleeve from the first shaft, said means comprising a lever connected with said slidable gears on the second shaft, and means operable by said lever for moving said sleeve longitudinally on the first shaft.

7. In a transmission mechanism the combination of a shaft, a sleeve rotatably mounted thereon, a collar fixed to said shaft and adapted to lock the sleeve thereto, a gear mounted on the sleeve and rotatable therewith, a plurality of gears fixed to the shaft, a second shaft, a sleeve slidably mounted on the second shaft and rotatable therewith, a plurality of gears on said last-named sleeve adapted to mesh with the plurality of gears on the first shaft, an additional gear on the second shaft meshing with the gear on the first sleeve, a rod connected with said sleeve for sliding it into locked and unlocked positions, means for normally forcing said rod into a position for unlocking the sleeve from the first shaft, a lever connected with the sleeve on the second shaft for manipulating it, and means operable by the lever for forcing the rod into position to lock the first-named sleeve to the first-named shaft.

8. In a transmission mechanism the combination of a shaft, a sleeve rotatably mounted thereon, a collar fixed to said shaft and adapted to lock the sleeve thereto, a gear mounted on the sleeve and rotatable therewith, a plurality of gears fixed to the shaft, a second shaft, a sleeve slidably mounted on the second shaft and rotatable therewith, a plurality of gears on said last-named sleeve adapted to mesh with the plurality of gears on the first shaft, an additional gear on the second shaft meshing with the gear on the first sleeve, a rod connected with said first sleeve for sliding it into locked and unlocked positions, means for normally forcing said rod into a position for unlocking the sleeve from the first shaft, a lever connected with the sleeve on the second shaft for manipulating it, and means operable by the lever for forcing the rod into position to lock the first-named sleeve to the first-named shaft, said means operable by the lever, comprising a reciprocable pin, a spring for forcing said pin toward the lever, said lever being adapted to engage the pin and force it in the opposite direction, and a bell-crank having an arm in the path of motion of said pin and connected with said rod.

9. In a transmission mechanism the combination of a shaft, a sleeve rotatably mounted thereon, a collar fixed to said shaft and adapted to lock the sleeve thereto, a gear mounted on the sleeve and rotatable therewith, a plurality of gears fixed to the shaft, a second shaft, a sleeve slidably mounted on the second shaft and rotatable therewith, a plurality of gears on said last-named sleeve adapted to mesh with the plurality of gears on the first shaft, an additional gear on the second shaft meshing with the gear on the first sleeve, a rod connected with said first sleeve for sliding it into locked and unlocked positions, means for normally forcing said rod into a position for unlocking the sleeve from the first shaft, a lever connected with the sleeve on the second shaft for manipulating it, and means operable by the lever for forcing the rod into position to lock the first-named sleeve to the first-named shaft, said means operable by the lever, comprising a reciprocable pin adapted to be engaged by the lever and forced in one direction, a spring for forcing the pin in the opposite direction, a roller on the pin, a bell-crank, one arm of which is connected with said rod and the other arm having an inclined surface adapted to be engaged by said roller, whereby the forcing of the pin in one direction by the lever will manipulate the bell-crank.

10. In a transmission mechanism the combination of a shaft, a sleeve rotatably mounted thereon, a collar fixed to said shaft and adapted to lock the sleeve thereto, a gear mounted on the sleeve and rotatable therewith, a plurality of gears fixed to the shaft, a second shaft, a sleeve slidably mounted on the second shaft and rotatable therewith, a plurality of gears on said last-named sleeve adapted to mesh with the plurality of gears on the first shaft, an additional gear on the second shaft meshing with the gear on the first sleeve, a rod connected with said first sleeve for sliding it into locked and unlocked positions, means for normally forcing said rod into a position for unlocking the sleeve from the first shaft, a lever connected with the sleeve on the second shaft for manipulating it, and a reversing means connected with said first-named gear.

11. A power-transmitting mechanism comprising a shaft, a sleeve thereon, means for locking the sleeve to the shaft, a gear on the sleeve and rotatable therewith, a plurality of additional gears on the shaft, a second shaft, a gear on the second shaft meshing with said gear on the sleeve, a plurality of gears slidably mounted on a second shaft and rotatable therewith for engaging the plurality of gears on the first shaft, and means for sliding one of the gears on the second shaft into mesh with one of the gears on the first shaft and unlocking the sleeve from the first shaft, said means comprising a lever connected with said slidable gears on the second shaft, means operable by said lever for moving said sleeve longitudinally on the first shaft, and reversing means comprising a slidable pinion adapted to engage the first-named gear, and means for sliding said pinion in one direction and the first-named gear in the other direction.

12. In a power-transmission mechanism the combination of a shaft, a sleeve rotatably and slidably mounted thereon, means on the shaft for locking the sleeve to the shaft when the sleeve moves to a certain position, a gear slidably mounted on said sleeve and rotatable with the sleeve, a plurality of gears on said shaft, a second shaft, a sleeve on the second shaft, a plurality of gears on said last-named sleeve for engaging the gears on the first-named shaft, an additional gear on the second shaft for engaging the gear on the first sleeve and slidable longitudinally on its shaft, a gear adapted to mesh with the first-named gear and receive power therefrom, a pinon, and means for moving said pinion into engagement with the last-named gear, moving the first-named gear out of engagement with the last-named gear, and bringing the first-named gear into mesh with the pinion for reversing the motion of the last-named gear, and means for changing the speed of the last-named gear both when the motion thereof is in its normal direction and when it is reversed.

13. In a power-transmission mechanism the combination of a shaft, a sleeve rotatably and slidably mounted thereon, means on the shaft for locking the sleeve to the shaft when the sleeve moves to a certain position, a gear slidably mounted on said sleeve and rotatable with the sleeve, a plurality of gears on said shaft, a second shaft, a sleeve on the second shaft, a plurality of gears on said last-named sleeve for engaging the gears on the first-named shaft, an additional gear on the second shaft for engaging the gear on the first sleeve and slidable longitudinally on its shaft, a gear adapted to mesh with the first-named gear and receive power therefrom, a pinion, and means for moving said pinion into engagement with the last-named gear, moving the first-named gear out of engagement with the last-named gear and bringing the first-named gear into mesh with the pinion for reversing the motion of the last-named gear.

14. In a power-transmission mechanism the combination of a shaft, a sleeve rotatably mounted thereon and slidable thereon, a gear slidably mounted on said sleeve, means on the shaft for locking the sleeve with respect thereto when the latter is in a certain position a second gear on said shaft, a second shaft, a gear slidably mounted thereon, and adapted to engage the second gear on the first shaft, a second gear on the second shaft slidably mounted thereon at all times in mesh with the gear on the sleeve, means for moving the sleeve to unlock the same from the first-named shaft, whereby motion can be transmitted from the second shaft to the gear through the gears on the first and second shafts at a different rate of speed from the speed of the first shaft, a gear meshing with the first-named gear for receiving power therefrom, a slidable pinion adapted to mesh with the first and last gears, and means for moving the first gear into engagement with the pinion, and moving the pinion into engagement with the last gear.

15. In a power-transmission mechanism, the combination of a shaft, a sleeve mounted to slide and to turn on said shaft, means for locking the sleeve to the shaft, means for unlocking the sleeve from the shaft, a gear slidable on said sleeve, a second shaft, a gear mounted to slide on said second shaft and to turn therewith, the said gear being at all times in mesh with the gear on the sleeve, another gear adapted to mesh with said gear on the sleeve for receiving power therefrom, a shaft, a pinion slidably mounted on the shaft, means for moving said pinion into engagement with the gear on the sleeve and the power-receiving gear and moving one of said gears out of engagement with the other, and means for transmitting motion from the first shaft to the second shaft at different rates of speed.

16. In a power-transmission mechanism the combination of a shaft, a gear slidable thereon, a gear adapted to mesh with the first-named gear for receiving power therefrom, a shaft, a pinion slidably mounted on the shaft, means for moving said pinion into engagement with both of said gears and moving one of said gears out of engagement with the other, said means comprising a sliding rod connected with said pinion, a link connected with said rod, a lever pivoted on two axes at right angles to each other for operating said rod, a second rod connected with the first gear, and means for connecting the second rod with said lever.

17. In a power-transmission mechanism the combination of a shaft, a sleeve rotatably and slidably mounted thereon, means for locking the sleeve to the shaft and unlocking the same, a gear slidable on the sleeve, a gear adapted to mesh with the first-named gear for receiving power therefrom, a shaft, a pinion slidably mounted on the shaft, means for moving said pinion into engagement with both of said gears and moving one of said gears out of engagement with the other, and an oil-tight casing for receiving said gears.

18. In a power-transmission mechanism the combination of a shaft, a sleeve rotatably and slidably mounted thereon, means on the shaft for locking the sleeve to the shaft when the sleeve moves to a certain position, a gear slidably mounted on said sleeve and rotatable with the sleeve, a plurality of gears on said shaft, a second shaft, a sleeve on the second shaft, a plurality of gears on said last-named sleeve for engaging the gears of the first-named shaft, an additional gear on the second shaft for engaging the gear on the first sleeve and slidable longitudinally on its shaft, a gear adapted to mesh with the first-named gear and receive power therefrom, a pinion, and means for moving said pinion into engagement with the last-named gear, moving the first-named gear out of engagement with the last-named gear and bringing the first-named gear into mesh with the pinion for reversing the motion of the last-named gear, means for changing the speed of the last-named gear both when the motion thereof is in its normal direction and when it is reversed, and an oil-tight casing for receiving said gears and shafts.

In testimony whereof I have signed my name to this specification in the presence of two subscribing witnesses.

JESSE JEREMIAH TROEGER.

Witnesses:
 HENRY A. TROEGER,
 GEORGE E. TROEGER.